United States Patent [19]
Dovek et al.

[11] Patent Number: 5,455,730
[45] Date of Patent: Oct. 3, 1995

[54] CONTACT MAGNETIC RECORDING DISK FILE WITH A MAGNETORESISTIVE READ SENSOR

[75] Inventors: Moris M. Dovek, Pleasanton; John S. Foster, Morgan Hill; Donald K. F. Lam, Los Altos; Erich Sawatzky, San Jose, all of Calif.

[73] Assignee: International Business Machines Corporation, Armonk, N.Y.

[21] Appl. No.: 19,968

[22] Filed: Feb. 18, 1993

[51] Int. Cl.$^6$ .............................. G11B 5/09; G11B 5/127; G11B 5/33
[52] U.S. Cl. .............................. 360/113; 360/66
[58] Field of Search .................. 360/86, 97.01, 360/97.02, 97.03, 98.01, 98.07, 99.06, 99.12, 102, 103, 104, 105, 106, 107, 110, 113, 119, 122, 131, 133, 66, 67; 338/32 R; 324/252

[56] References Cited

U.S. PATENT DOCUMENTS

| | | | |
|---|---|---|---|
| 2,969,435 | 1/1961 | Lynott | 179/100.2 |
| 3,908,194 | 9/1975 | Romankiw | 360/113 |
| 4,040,113 | 8/1977 | Gorter | 360/113 |
| 4,122,505 | 10/1978 | Kuijk | 360/113 |
| 4,167,765 | 9/1979 | Watrous | 360/103 |
| 4,225,892 | 9/1980 | Bassett et al. | 360/113 |
| 4,605,977 | 8/1986 | Matthews | 360/103 |
| 4,625,249 | 11/1986 | Iwata | 360/104 |
| 4,669,011 | 5/1987 | Lemke | 360/103 |
| 4,706,138 | 11/1987 | Jove et al. | 360/67 |
| 4,786,993 | 11/1988 | Jove et al. | 360/67 |
| 4,819,091 | 4/1989 | Brezoczky et al. | 360/97.01 |
| 4,914,398 | 4/1990 | Jove et al. | 328/167 |
| 5,041,932 | 8/1991 | Hamilton | 360/104 |
| 5,072,320 | 12/1991 | Ezaki et al. | 360/97.01 |
| 5,097,368 | 3/1992 | Lemke et al. | 360/97.02 |
| 5,200,867 | 4/1993 | Albrecht et al. | 360/103 |
| 5,202,803 | 4/1993 | Albrecht et al. | 360/97.02 |

FOREIGN PATENT DOCUMENTS

| | | |
|---|---|---|
| 0242597 | 10/1987 | European Pat. Off. . |
| 0367510 | 6/1990 | European Pat. Off. . |
| 60-617 | 1/1985 | Japan .............. 360/103 |
| 60-163221 | 8/1985 | Japan .............. 360/113 |
| 61-17203 | 1/1986 | Japan .............. 360/113 |
| 62-121917 | 6/1987 | Japan .............. 360/113 |
| 0189016 | 4/1989 | Japan .............. 360/103 |

OTHER PUBLICATIONS

IBM Technical Disclosure Bulletin Bajorek et al vol. 18 No. 2 Jul. 1975 "Negative Temperature Coefficient Material for MR Element Thermal Noise" p. 540.

IBM Technical Disclosure Bulletin, Arnold et al vol. 22 No. 5 Oct. 1979 pp. 2149–2150 "Wear–Resistant Substrates with Good Thermal Conductivity".

Primary Examiner—Stuart S. Levy
Assistant Examiner—William J. Klimowicz
Attorney, Agent, or Firm—Thomas R. Berthold

[57] ABSTRACT

A contact magnetic recording rigid disk file utilizes a magnetoresistive (MR) sensor for reading data recorded on the disk. The disk file may be of the liquid-bearing type of contact recording with the MR sensor supported on the trailing end of a carrier which rides on the liquid bearing. The performance of the disk file is enhanced by including means for minimizing the effect of a discovered baseline read signal modulation. The modulation has been determined to be caused by variable cooling of the temperature-sensitive and temperature-elevated MR sensor by the disk, with the temperature variation being directly related to the variation in head-disk spacing caused by the waviness of the surface of the disk. A filter may be incorporated into the read signal processing circuitry of the disk file to eliminate the modulation, the MR sensor may be designed to operate at selected parameters to minimize the effect of the baseline modulation, and the portion of the carrier in contact with the disk surface may be selected to have a length less than the period of the disk waviness so that it more closely follows the disk surface topography.

31 Claims, 9 Drawing Sheets

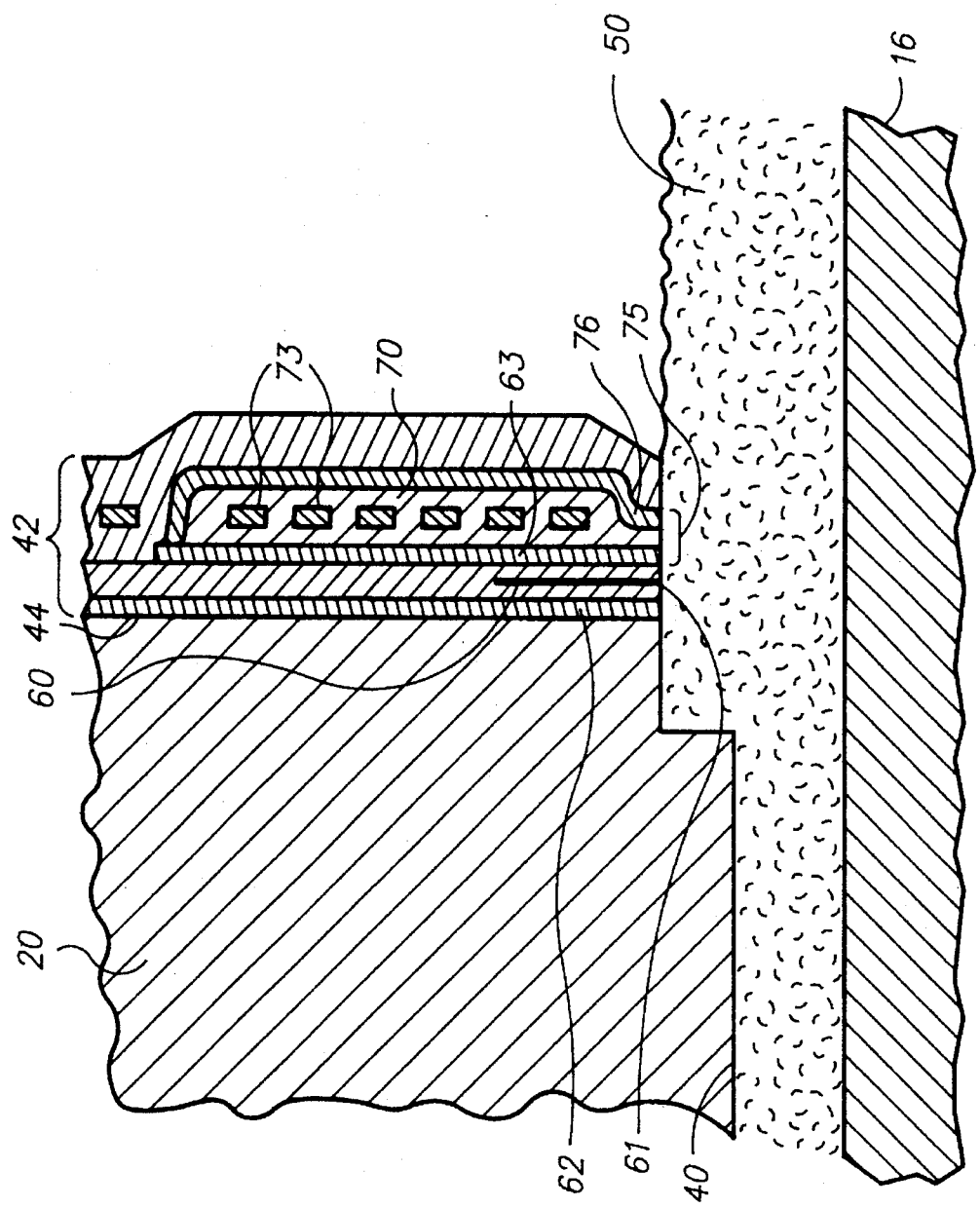

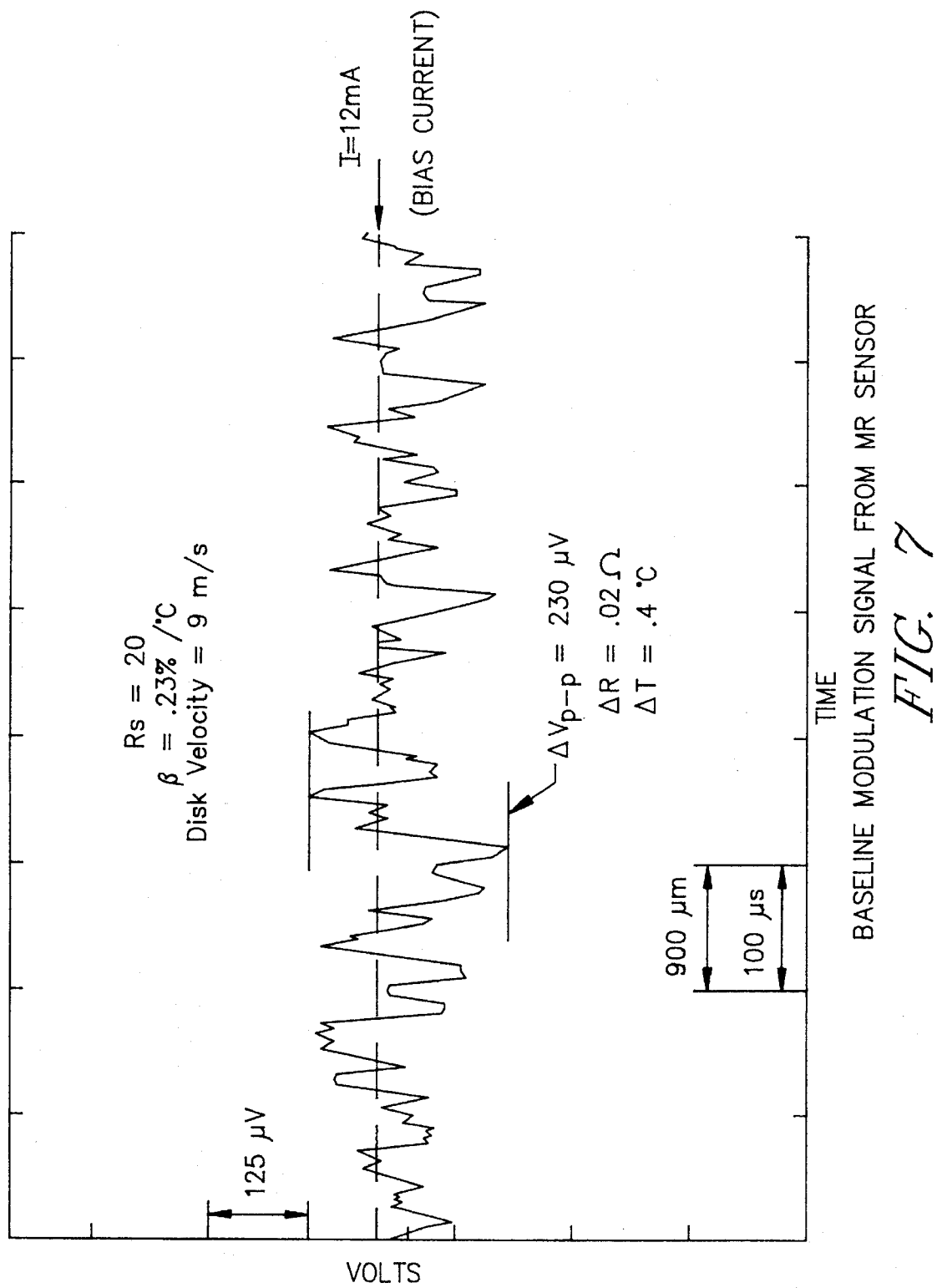
FIG. 7 BASELINE MODULATION SIGNAL FROM MR SENSOR

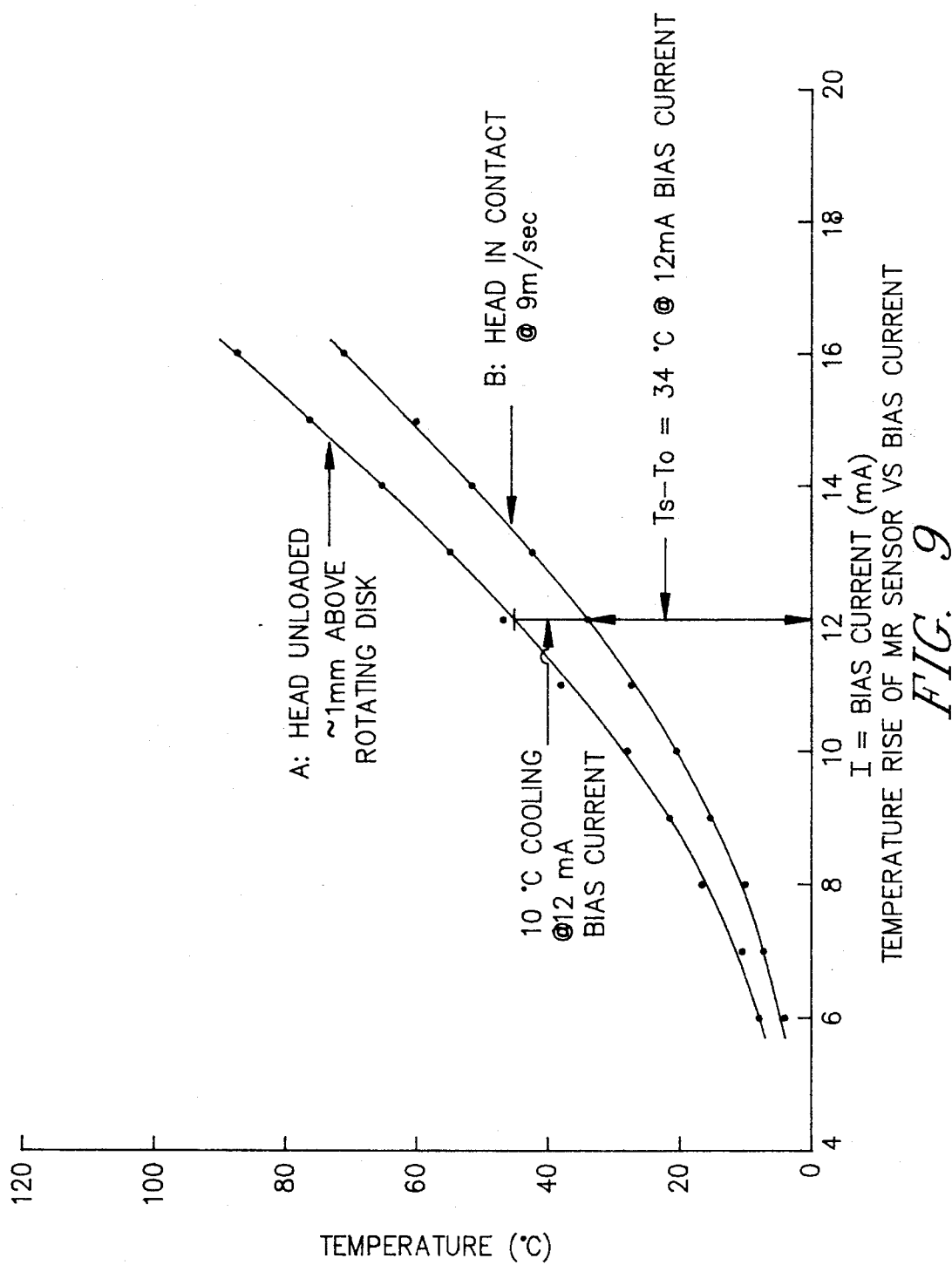

CONTACT MAGNETIC RECORDING DISK FILE WITH A MAGNETORESISTIVE READ SENSOR

TECHNICAL FIELD

This invention relates to magnetic recording rigid disk files (or drives), and in particular to such disk files wherein the magnetic recording transducer is in contact with the surface of the magnetic recording disk during read and write operations.

BACKGROUND OF THE INVENTION

In conventional "air-bearing" rotating rigid disk files, each of the read/write transducers (or heads) is supported on a carrier (or slider) which rides on a cushion or bearing of air above the surface of its associated disk when the disk is rotating at its operating speed. The slider is connected to a linear or rotary actuator by means of a relatively fragile suspension. There may be a stack of disks in the disk file with the actuator supporting a number of sliders. The actuator moves the sliders generally radially so that each head may access the recording area of its associated disk surface. In these conventional disk files the slider is connected to a suspension and is either biased towards the disk surface by a small force from the suspension or is "self-loaded" to the disk by means of a "negative pressure" air-bearing surface. The slider is typically in contact with the disk surface only during start and stop operations; i.e., from the time the disk file is turned on until the disk reaches a speed sufficient to cause the slider to ride on the air-bearing, and again when the disk file is turned off and the rotational speed of the disk falls below that necessary to create the air-bearing.

The conventional head used for reading and writing data on thin film disks in air-bearing disk files is a dual function inductive read/write head. Because such a head must be able to both read and write data, trade-offs must be made in the design of the head and disk parameters in order to optimize both the read and write data signals in the disk drive. In order to overcome this disadvantage, magnetoresistive (MR) read sensors (or heads), which generate a read signal as a result of a change in electrical resistance caused by the magnetic fields recorded on the disk, have been proposed to be used with inductive write heads in air-bearing disk files. By way of example, assignee's U.S. Pat. No. 3,908,194 describes a "piggyback" thin film head which combines an MR read head and an inductive write head. The first commercial air-bearing rigid disk file with an MR read head and an inductive write head was the IBM "Corsair" disk drive available in 1991.

It has been known since the early days of magnetic recording that "contact" recording is desirable because the amplitude of the read signal from the disk decreases with increasing head-disk spacing. Thus, in addition to the above-described conventional air-bearing disk files, "contact" recording rigid disk files have been proposed.

In one type of contact recording, referred to as "liquid-bearing" contact recording, the head-disk interface includes a liquid film as a liquid bearing between the transducer carrier and the disk. There are several references which describe different types of liquid-bearing disk files. In assignee's U.S. Pat. No. 2,969,435, a sled-type transducer carrier with a large flat surface rides on a layer of oil on the disk, the oil being supplied from an oil reservoir external to the disk file and discharged from a nozzle located ahead of the carrier. Other examples of liquid-bearing contact recording disk files are described in assignee's pending application, U.S. Ser. No. 264,604, now abandoned, filed Oct. 31, 1988, and published May 9, 1990 as European published application EP 367510, and in U.S. Pat. No. 5,097,368, filed Dec. 20, 1989. In these types of liquid-bearing disk files a liquid is continuously recirculated throughout the disk file to maintain a relatively thick liquid film on the disk, and the head carrier has a plurality of pads which plow through the liquid film as the disk rotates. More recently, in assignee's copending application U.S. Ser. No. 07/724,646, now U.S. Pat. No. 5,202,803, a liquid-bearing disk file has been described wherein a relatively thin lubricant film is maintained on the disk and a transducer carrier, having specially adapted pads or "ski feet", rides on the surface of the liquid film as the disk rotates. When the disk file reaches operating speed, the forward portion of the transducer carrier is raised above the liquid film due to an air-bearing effect, while the rear pad or ski foot rides on the surface of the liquid film.

In another type of contact recording, referred to as "dry" contact recording, the disk file uses an integrated head-suspension which makes physical contact with the disk surface during read and write operations. In this type of head-suspension, as described for example in U.S. Pat. No. 5,041,932, a portion of the head wears away due to frictional contact with the disk over the life of the disk file. Another type of "dry" contact recording disk file, as described in assignee's U.S. Pat. No. 4,819,091 utilizes a wear-resistant single crystal head carrier which is maintained in contact with the disk by means of an attractive force generated by the frictional contact between the carrier and the rotating disk. While these types of contact recording disk files are referred to as "dry", it is possible to also utilize a thin liquid lubricant film on the disk, even though this film may not function as a liquid bearing in the same manner as for liquid-bearing contact recording disk files.

In all of these contact recording techniques for rigid disk files, the head may not always be in physical contact with the actual surface of the rigid disk because of the presence of a liquid film and/or because the head carrier may periodically skip or fly over the disk surface. Nevertheless, for purposes of the present invention, the term "contact" recording in rigid disk files shall include these types of "near contact" recording as well.

None of the proposed contact recording techniques contemplate the use of an MR read sensor, or suggest any means to incorporate an MR read sensor, and its associated benefits, into a disk file which has a head carrier maintained in contact with the disk during read and write operations. Thus what is needed is a contact recording disk file which utilizes an MR read sensor.

SUMMARY OF THE INVENTION

The invention is a contact magnetic recording disk file which utilizes a magnetoresistive (MR) read sensor. In a preferred embodiment, the disk file is of the liquid-bearing type of contact recording with the MR sensor supported on the trailing end of a carrier which rides on the liquid bearing.

It was discovered that due to the extremely close head-disk spacing in contact recording disk files, the "waviness" of the disk substrate induces a baseline signal modulation on the signal output from the MR sensor. This modulation has been determined to be due to cooling of the temperature-sensitive and temperature-elevated MR sensor by the disk, with the temperature variation being directly related to the variation in head-disk spacing caused by the disk waviness.

The performance of the disk file of the present invention may be improved by assuring that the effect of this baseline signal modulation is minimized. A filter may be incorporated into the read signal processing circuitry to eliminate the modulation, the MR sensor may be designed by appropriate selection of certain parameters in order to minimize the effect of MR sensor cooling caused by the close head-disk spacing, or the contact pad of the carrier may be designed to be more compatible with a disk having a particular waviness.

For a fuller understanding of the nature and advantages of the present invention, reference should be made to the following detailed description taken in conjunction with the accompanying drawings.

BRIEF DESCRIPTION OF THE DRAWING

FIG. 5 is an enlarged sectional view of a portion of the end of the head carrier and the disk illustrating the liquid bearing head-disk interface;

FIG. 7 is a graph of read signal voltage as a function of time from the MR sensor while the head carrier is in contact with the rotating disk;

FIG. 9 is a graph of temperature of the MR sensor above ambient as a function of bias current;

Description of the Preferred Embodiments

Figure 1:
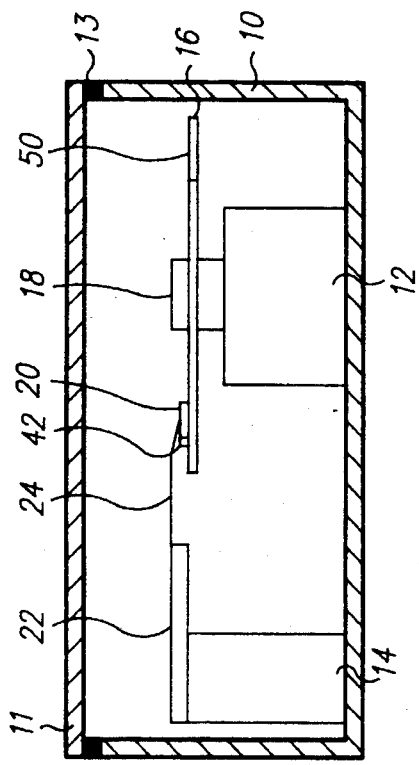
FIG. 1 is a view in section of a schematic of the liquid-bearing contact recording disk file of the present invention.

Referring first to FIG. 1, there is illustrated in sectional view a schematic of the liquid-bearing contact recording embodiment of the disk file of the present invention. The disk file comprises a base 10 to which are secured a disk drive motor 12 and an actuator 14, and a cover 11. The base 10 and cover 11 provide a substantially sealed housing for the disk drive. Typically there is a gasket 13 located between base 10 and cover 11 and a small breather port (not shown) for equalizing pressure between the interior of the disk file and the outside environment. This type of disk file is described as being substantially sealed since the drive motor 12 is located entirely within the housing and there is no external forced air supply for cooling the interior components. A magnetic recording disk 16 is mounted on a hub 18, which is attached for rotation by drive motor 12. The disk 16 includes a thin film 50 of liquid lubricant which is maintained on the surface of disk 16 as a liquid bearing. A transducer carrier 20 supports the MR read/inductive write head 42. The carrier 20 is connected to the actuator 14 by means of a rigid arm 22 and a suspension 24, the suspension 24 providing a biasing force which urges the transducer carrier 20 onto the liquid bearing 50 on the recording disk 16. During operation of the disk file the drive motor 12 rotates the disk 16 at a constant speed, and the actuator 14, which is typically a linear or rotary voice coil motor (VCM), moves the transducer carrier 20 generally radially across the surface of the disk 16 so that the head may access different data tracks on disk 16.

Figure 2:
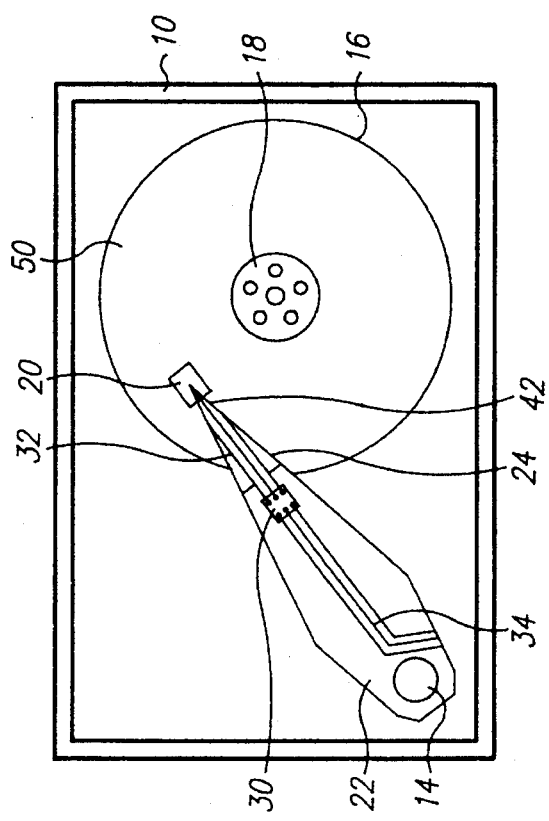
FIG. 2 is an open top view of the disk file depicted schematically in FIG. 1.

FIG. 2 illustrates a top view of the interior of the disk file with the cover 11 removed, and shows in better detail the suspension 24 which provides a force to the carrier 20 to urge it into contact with the lubricant film 50 of disk 16. The suspension may be a conventional type of suspension such as that used in magnetic disk files which have an air-bearing slider. An example is the well-known Watrous suspension, as described in assignee's U.S. Pat. No. 4,167,765. This type of suspension also provides a gimballed attachment of the transducer carrier which allows the carrier to pitch and roll as it rides on the liquid lubricant film.

Figure 3:
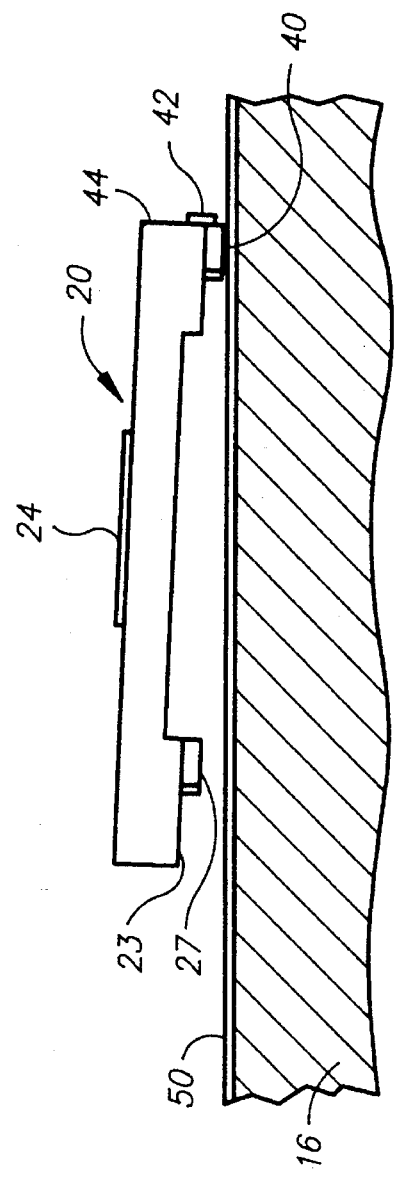
FIG. 3 is a side view of the head carrier on the disk showing the disk in section to depict the liquid film.

FIG. 3 illustrates a side view of the transducer carrier 20 and a sectional view of the disk 16 in the liquid bearing contact recording embodiment of the present invention. The carrier 20 has a contact pad in the form of ski foot 40 near its rear end, and the MR read/inductive write head 42 located on its trailing edge 44. The ski foot 40 is generally in contact with a liquid film 50 of disk 16 and is urged into contact during read or write operations by the bias force supplied by the attached suspension 24. An air-bearing surface 23 is provided at the front end of carrier 20 to cause the front end to fly while the rear ski foot 40 rides on lubricant film 50 when the disk 16 is rotating at its operational speed.

Figure 4:
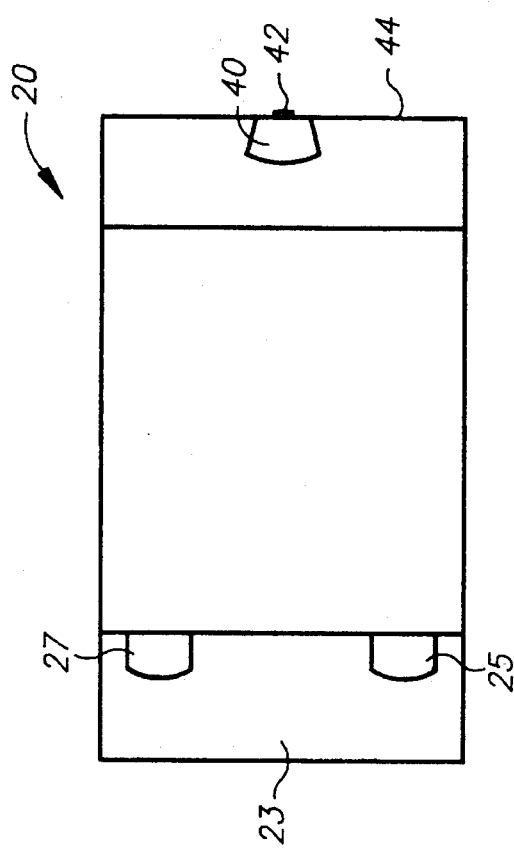
FIG. 4 is a plan view of the bottom or disk side of the head carrier shown in FIG. 3.

The bottom or disk side of carrier 20 is illustrated in FIG. 4. The front air-bearing surface 23 includes a pair of pads 25, 27 which assist in the air-bearing effect for the carrier front end, as well as support the carrier on the lubricant film 50 when the disk is not rotating at its operational speed. The surfaces and pads of carrier 20, as shown in FIG. 4, are formed by conventional air-bearing slider fabrication techniques, such as machining, reactive ion etching, and ion milling.

Referring now to FIG. 5, a sectional view illustrates a portion of disk 16 with lubricant film 50 and an enlarged portion of carrier 20 with the MR read/inductive write head 42 formed as a thin film head on the trailing edge 44. Both the MR read sensor 60 and the inductive write head 62 are formed as thin films on the rear or trailing edge 44 of the carrier 20, which serves as the substrate for the deposition of the films. The MR read sensor 60 has an end 61 and is located between spaced-apart shields 62, 63. MR sensor 60 is often referred to as a "stripe" of magnetoresistive material having a thickness t (in the direction parallel to the disk surface) and a height h (in the direction perpendicular to the disk surface). The inductive write head 70 has a coil 73 (shown in section) and a recording gap 75. The recording gap 75 is defined by two pole tips, one of which is pole tip 76 and the other of which also serves as MR shield 63. Both the end 61 of MR read sensor 60 and the gap 75 of inductive write head 70 are oriented toward the surface of disk 16 for reading and writing data and are recessed from the end of ski foot 40. The end of the ski foot 40 and the end 61 of MR sensor 60 are typically in contact with the lubricant film 50 on disk 16 during read and write operations. Because the inductive head 70 is not required to read data recorded in the magnetic layer of disk 16, its design can be optimized for writing.

Referring again to FIG. 2, the data detected from disk 16 by the MR sensor 60 (FIG. 5), which is part of head 42, is processed into a data readback signal by signal processing circuitry in the integrated circuit chip 30 located on arm 22. The chip 30 typically includes pre-amplification and other signal processing circuitry using conventional techniques such as that described in assignee's U.S. Pat. Nos. 4,706,138 and 4,786,993. The signals from the MR sensor travel via cable 32 to chip 30, which sends its output signals via cable 34.

Figure 6:
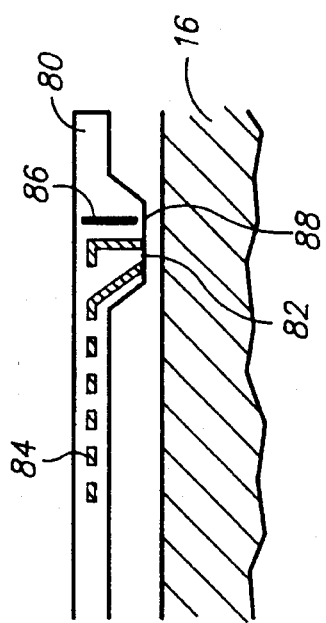
FIG. 6 is a sectional view of an integrated head-suspension and the disk in the dry contact recording embodiment of the present invention.

FIG. 6 illustrates a side sectional view of an integrated head-suspension 80 and a sectional view of the disk 16 in a "dry" contact recording embodiment of the present invention. The integrated head-suspension 80 serves the function of both the suspension 24 and the carrier 20 in the liquid bearing embodiment of FIG. 3. In contrast, however, the transducer, shown as an inductive write head, with pole piece 82, coil 84, and MR read sensor 86, is embedded within the integrated head-suspension 80. The head-suspension 80 has a wear pad 88 which makes contact with the surface of disk 16 during read and write operations and slowly wears away during the life of the disk file. The suspension portion of the integrated head-suspension 80 is attached to the actuator with a slight pre-stressed bend so that a force is maintained on the head portion to urge the wear pad 88 generally into contact with disk 16 and to maintain it generally in contact during read and write operations. The disk 16 may include a thin film of lubricant on its surface for contact by wear pad 88 to minimize wear of the contact pad and the disk.

The liquid-bearing contact recording disk file represented in FIGS. 1–was tested using a 2-½" thin film disk 16 having a cobalt-platinum-chromium magnetic layer and a 150 Angstroms thick protective carbon overcoat. A conventional perfluoropolyether lubricant (Demnum brand SP) was applied by dipping to form the liquid film 50 to a thickness of approximately 42 Angstroms on the carbon overcoat. The transducer carrier 20 depicted in FIG. 3 was fabricated by conventional ion milling with a carbon ski pad 40 extending from the carrier body approximately 1600 Angstroms. The load applied to the carrier 20 by the suspension 24 was in the range of 4–6 grams. Interaction of the carrier 20 with disk 16 in the form of high drag (>0.2 gm) and velocity jitter occurred up to approximately 3–4 m/sec. From that velocity up to approximately 10 m/sec. the pad 40 was generally in contact with the liquid film on the disk.

The readback signal from MR sensor 60 was measured during operation of the disk file. A significant fluctuation in the baseline of the output signal from MR sensor 60 was observed. This fluctuation or baseline modulation of the MR readback signal was found to be synchronous with disk rotation. The baseline modulation signal was additive to the magnetic signal, but was not magnetic in origin. It could not be erased with the inductive write head 70, and was also found to exist on non-magnetic disks. The amplitude of this baseline modulation signal was found to be as high as one half of the magnetic signal on disks with a nominal bias current applied to the MR sensor 60. This unexpected baseline signal modulation can contribute to errors in the readback signal, which can render an MR sensor unusable in a contact recording disk file.

Figure 8:
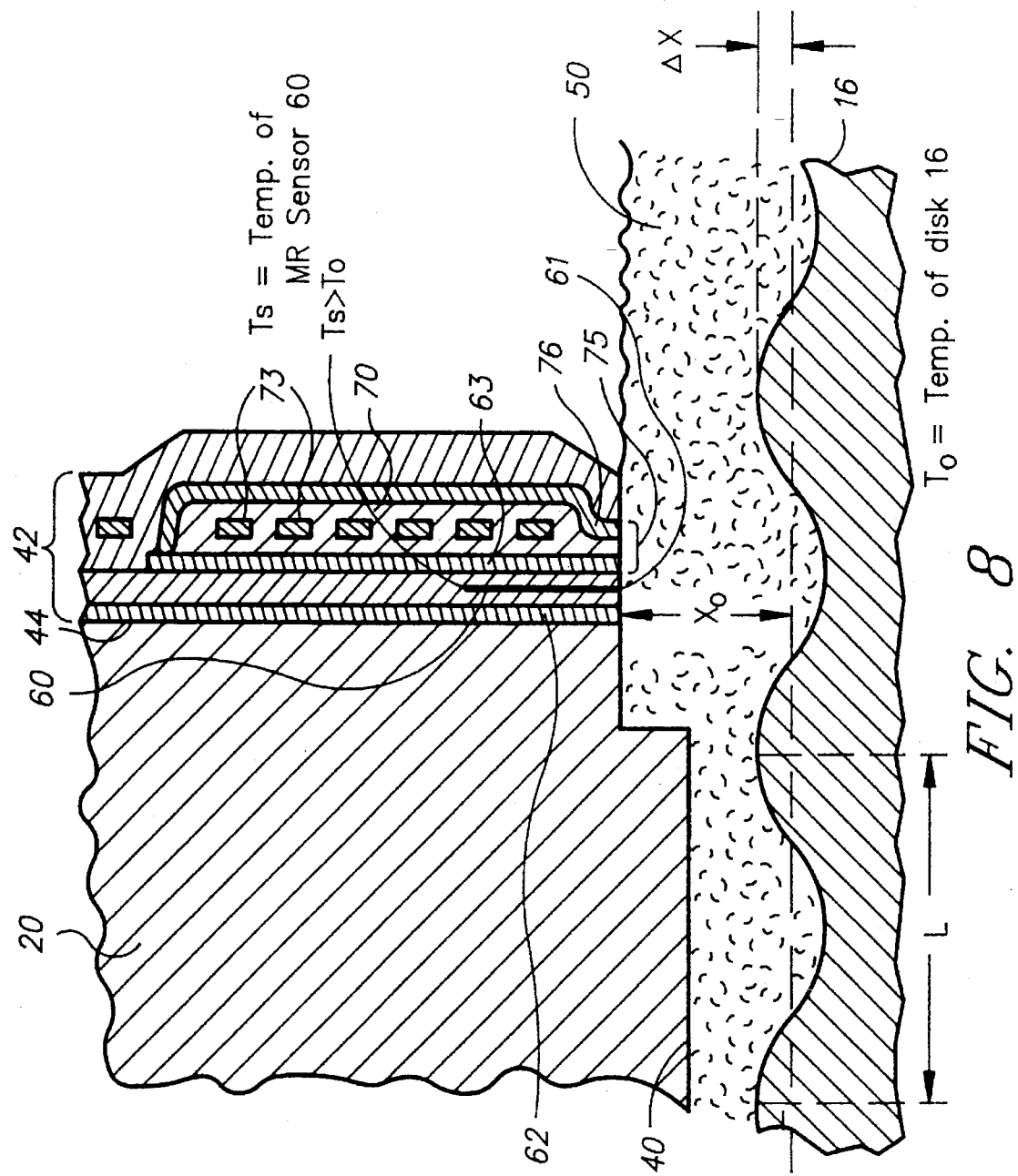
FIG. 8 is the head-disk interface shown in FIG. 5 modified to illustrate waviness of the disk surface.

A typical baseline modulation signal from the MR sensor 60 is shown in FIG. 7. This signal was obtained with a conventional MR sensor on the carrier on a disk rotating at a speed which generated a local disk velocity beneath the carrier 20 of approximately 9 m/sec. A bias current, I, of 12 mA was was applied to the MR sensor which had a characteristic temperature coefficient of resistance referred to as $\beta$, of 0.23%/°C. The maximum peak-to-peak amplitude of the baseline signal, $\Delta V(p\text{---}p)$, was approximately 230 micro-volts. This baseline signal shown in FIG. 7 repeated unchanged with each revolution of the disk. The signal shape changed when the head was moved to another radial position on the disk, but the new signal was again synchronous with disk rotation. The signal also reversed polarity with a reversal of bias current to the MR sensor The mechanism discovered to be responsible for the baseline modulation can be explained with reference to FIG. 8. The surface of disk 16 is not perfectly smooth, but has a residual waviness. This waviness has a range of amplitudes and wavelengths, with the average amplitude and wavelength being represented by $\Delta X$ and L, respectively. The MR sensor 60 rides over this waviness at an average spacing $X_0$. The rear pad 40 is designed to cause the average mechanical spacing $X_0$ to be about 100 Angstroms. The disk 16 is at essentially the constant ambient temperature $T_0$. The MR sensor 60, however, is at a temperature $T_s$, which is greater than $T_0$ because of Joule heating caused by the constant bias current I. $T_s$ is determined by the $I^2R$ power dissipated in the MR sensor 60 and by the thermal conductance from the MR sensor 60 to its surroundings, according to the following:

$$T_s - T_0 = \frac{I^2R}{(G_0 + G_1)} - \frac{I^2R(G_0 - G_1)}{G_0^2} \tag{1}$$

where R is the resistance of MR sensor 60, $G_0$ is the thermal conductance from MR sensor 60 to the carrier 20, $G_1$ is the thermal conductance from MR sensor 60 to disk 16, and $G_1$ is typically much smaller than $G_0$. Most of the heat is conducted away from MR sensor 60 internally to the body of carrier 20. However, if the spacing between the MR sensor 60 and disk 16 is small, as in contact recording, some heat will be conducted to the disk through the gap $X_0$ separating the MR sensor 60 and disk 16. Thus, the MR sensor 60 is cooled by the disk when the head-to-disk spacing is small.

The degree of this cooling depends on $T_s - T_0$ and the thermal conductance $G_1$ between the MR sensor 60 and disk 16. FIG. 9 shows this effect as a function of MR sensor bias current, I. Curve "A" is the MR sensor temperature above ambient when the head is unloaded about 1 mm above the rotating disk. Curve "B" is the MR sensor temperature when the carrier is riding at a head-disk spacing of approximately 100 Angstroms. Note that at a bias current of 12 mA, the MR sensor is about 10° C. lower when the carrier is riding on the liquid film. The close proximity of the disk 16 to the MR sensor 60 in contact recording has cooled the MR sensor in this experimental example from 44° C. above ambient to 34° C. above ambient. As a result of the above-described experimental results, the observed baseline signal modulation of FIG. 7 can be described in terms of this cooling effect. The disk waviness shown in FIG. 8 modulates the thermal conductance $G_1$ between the MR sensor 60 and disk 16. This in turn modulates the degree of cooling and hence the MR sensor temperature. The fluctuations in MR sensor temperature result in corresponding fluctuations in resistance, and this gives rise to the baseline modulation signal at constant bias current of the MR sensor.

Figure 10:
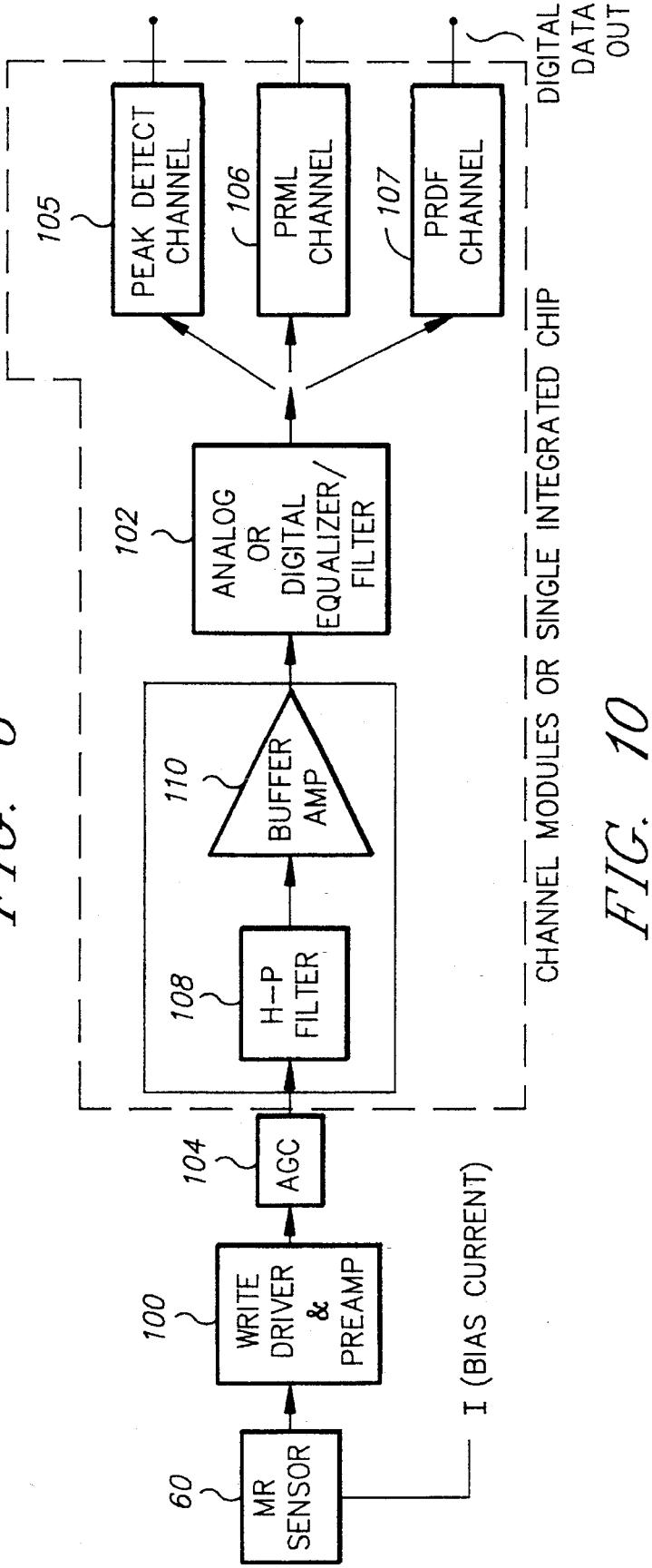
FIG. 10 is a block diagram of the read detection circuit including a filter to remove baseline signal modulation from the MR sensor signal.

In order to optimize the performance of an MR sensor if such a sensor is to be used in a contact recording disk file, it is thus necessary to develop techniques to remove or minimize this unexpected baseline signal modulation. Referring now to FIG. 10, there is illustrated a read channel for use with the present invention. The conventional commercially available components making up the read channel connected to MR sensor 60 include a preamplifier 100 included as part of a conventional write driver and preamp chip, which is typically located on the actuator arm (see chip 30 in FIG. 1), an equalizer/filter 102, automatic gain control (AGC) circuitry 104, and one of three processing signal channel elements. The three processing signal channel elements which may receive the output of equalizer/filter 102 include a peak detect channel 105, a partial-response maximum-likelihood (PRML) channel 106, or a partial-response digital filter (PRDF) channel 107.

Figure 11:
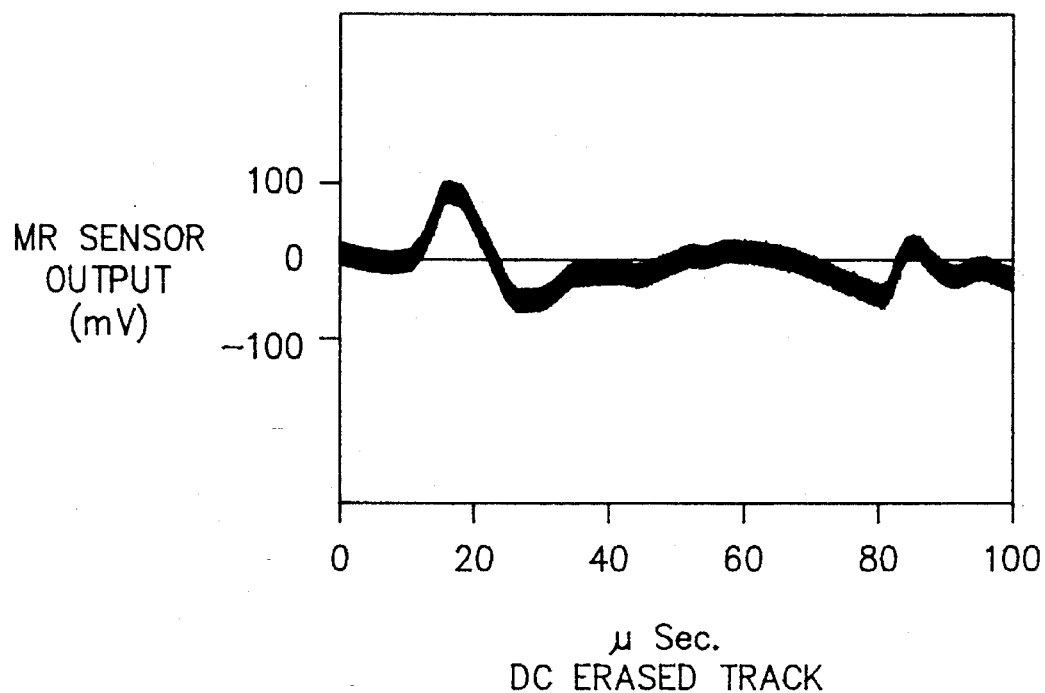
FIG. 11 is an actual baseline MR sensor signal from a DC erased track and is the baseline modulation caused by waviness of the disk.
Figure 12:
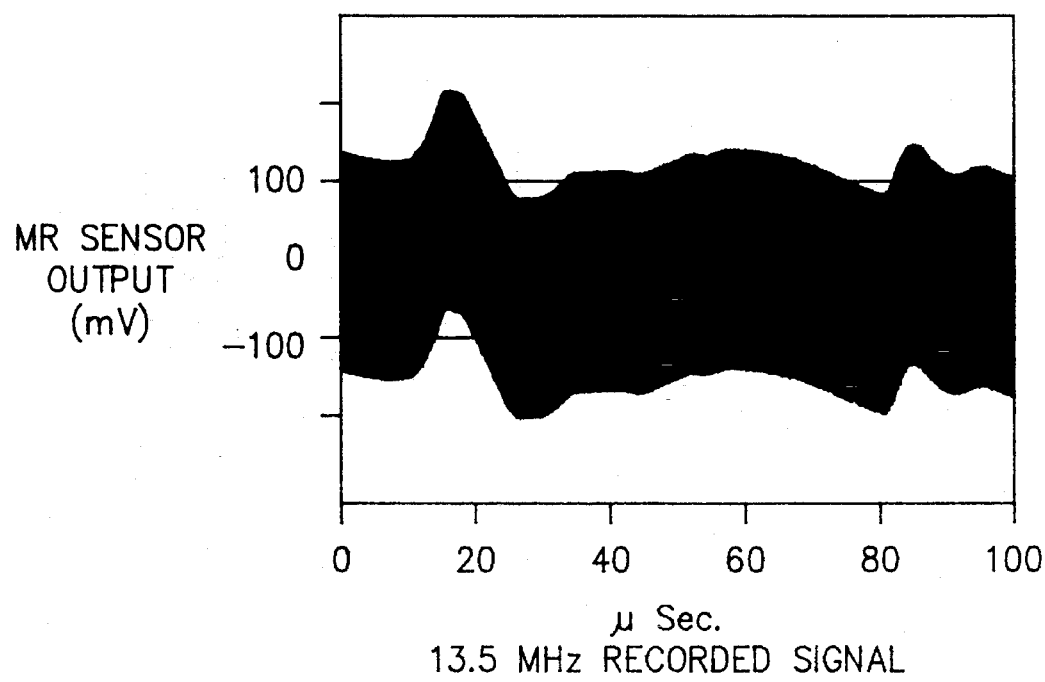
FIG. 12 is the MR sensor magnetic signal envelope from a track recorded at 13.5 MHz and superimposed on the baseline signal of FIG. 11.

Referring now to FIG. 11, the output of preamplifier 100 is shown for a signal from a DC erased track. FIG. 11 thus illustrates the baseline signal modulation caused solely by waviness of the disk substrate. The output of preamplifier 100 from the same track recorded with a 13.5 MHz signal is shown in FIG. 12. FIG. 12 thus illustrates the effect of the baseline signal modulation on the magnetic readback signal envelope. The high frequency components and additive nature of the resultant signal envelope shown in FIG. 12 are not correctable by AGC circuitry 104 in a conventional recording channel. As shown by FIGS. 11 and 12 the thermally induced baseline signal modulation imposes a significant amplitude excursion in the readback signal of up to 50% or greater. If left uncorrected this signal envelope would greatly reduce the noise margin available for signal detection available to the channel processing circuits 105, 106 or 107, resulting in high error rates of the readback signal. It has been determined experimentally that if the maximum baseline signal amplitude is less than about 20% of the amplitude of the magnetic readback signal, the output from the read channel is acceptable, although errors due to noise may be somewhat higher. However, if the ratio of the maximum or peak baseline signal amplitude to the amplitude of the magnetic readback signal is greater than about 0.2, then something must be done to remove or minimize the baseline signal modulation. The fact that the baseline signal modulation is additive to the readback signal allows the modulation signal to be removed by appropriate filtering. Referring again to FIG. 10, a high pass (H-P) single pole filter 108 and buffer amplifier 110 are included in the recording channel between AGC 104 and equalizer/filter 102 as a baseline modulation corrector. In the experimental results described, the baseline modulation signal has frequency components of 200 KHz and lower, with the major signal envelope excursions occurring at frequencies below 100 KHz. A single pole high pass filter 108 with an optimally chosen corner frequency effectively removes the detrimental effects caused by the signal. Buffer amplifier 110 is needed for impedance matching and to compensate for the insertion loss of the H-P filter 108. The criteria for determining the corner frequency is based upon experimental results and depends upon the linear velocity of the disk relative to the head and the waviness of the disk. For the experimental data described above, the corner frequency was determined to be approximately 150 KHz which results in removing amplitude excursions of approximately 10% or higher.

While the elements shown in FIG. 10 are illustrated as discrete commercially available modules for a recording channel, it is possible to integrate all the functions performed by elements 104, 108, 110, 102, and one of the processing signal channel options 105, 106, or 107 into a single chip. No current commercial channel chip incorporates a programmable H-P filter. The programmability of the corner frequency of the H-P filter is necessary for optimal removal of the baseline signal for various combinations of disks and disk drive rotational speeds. Such an integrated chip can be customarily built by mixed signal integrated circuit suppliers such as Analog Devices, VTC, Cirrus Logic or Plessey, for example.

As illustrated in FIG. 9, because the baseline signal modulation is a function of the difference between the temperature of the MR sensor and the ambient disk temperature, $T_s - T_0$, it may also be possible to substantially minimize the effect of the unwanted signal by appropriate design of the MR sensor. This can be understood by reference to Eq. (1) above.

The thermal conductance $G_0$ from MR sensor 60 to the carrier 20 can be estimated as follows:

$$G_0 = K_{INS} \cdot w \cdot h/g \qquad (2)$$

where $K_{INS}$ is the thermal conductivity of the insulator material in the gap region between MR sensor 60 and the adjacent shields 62, 63 (FIG. 8); g is the gap width between MR sensor 60 and shields 62, 63; w is the track width; and h is the height of MR sensor 60. The thermal conductance $G_1$ from MR sensor 60 to disk 16 can be estimated as follows:

$$G_1 = K_{HD} \cdot w \cdot t/(X_0 + dX) \sim K_{HD} \cdot w \cdot t \cdot (X_0 + dX)/X_0^2 \qquad (3)$$

where $K_{HD}$ is the thermal conductivity of the head-disk interface, t is the thickness of the MR sensor 60, and dX is the variation in head-disk spacing from $X_0$. The resistance R of the MR sensor 60 is given as follows:

$$R = \rho \cdot w/(t \cdot h) \qquad (4)$$

where $\rho$ = is the MR sensor resistivity. Substituting Eqs. 2–4 into Eq. 1 and using the known relationship that variations in MR sensor signal fluctuations are related to temperature variations by the following:

$$dV = I \cdot R \cdot \beta \cdot dT \qquad (5)$$

then, $$dV = (\rho/K_{INS})^2 \cdot \beta \cdot K_{HD} \cdot wI^3(g^2/(t \cdot h^4))(dX/X_0^2) \qquad (6)$$

Equation 6 thus expresses the variation in voltage, dV, of the MR sensor signal as a function of variation in the distance, dX, between MR sensor 60 and disk 16. The magnetic signal output of the MR sensor 60 is given by the following $$S \sim \rho_m \cdot I \cdot w/(t^2 \cdot h) \qquad (7)$$

where $\rho_m$ is the magnetoresitivity of the sensor material.

Figure 13:
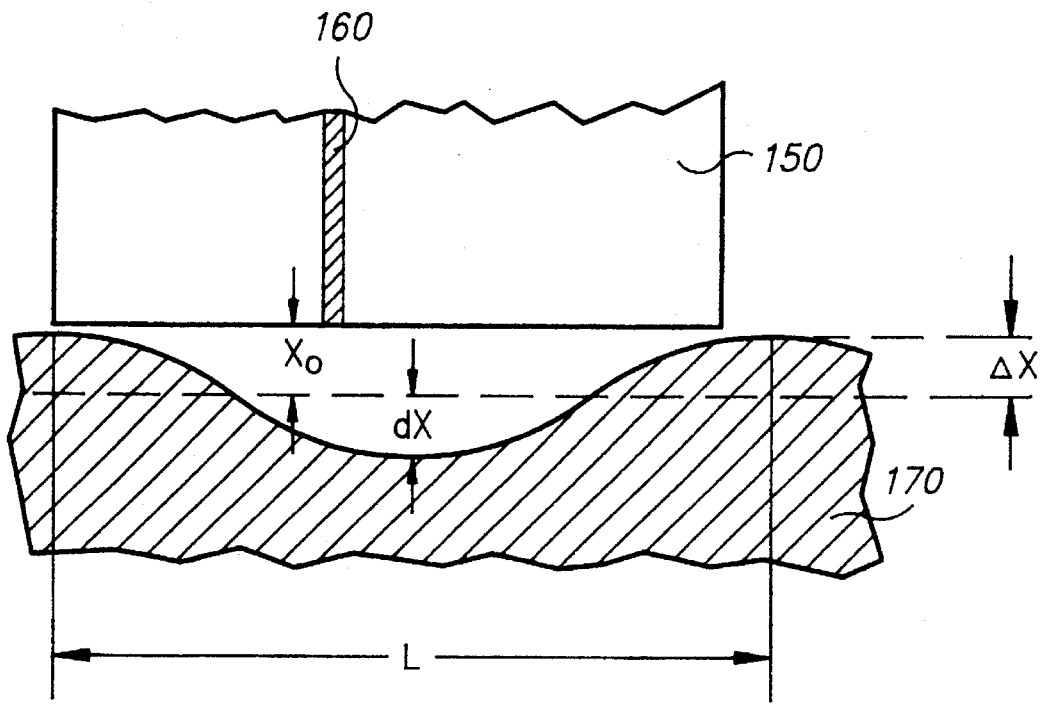
FIG. 13 is a representation of a head carrier contact pad on a disk having a particular waviness.
Figure 14:
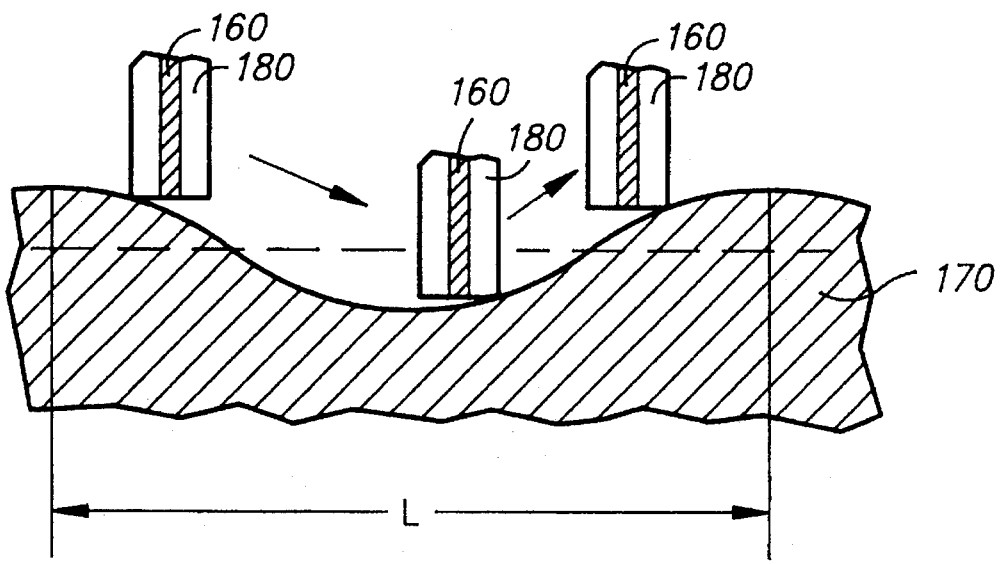
FIG. 14 is a representation of the head-disk spacing when the contact pad length is reduced for the disk represented in FIG. 13.

With an understanding of Eqs. 6 and 7 and thus the factors which affect dV and S it is possible to design the MR sensor, by varying certain of its parameters, to minimize dV without significantly affecting S. As stated previously if dV/S is maintained below approximately 0.2, the output of MR sensor 60 may be acceptable. For example, since the sensor height h inversely affects dV by the fourth power, but inversely affects S only linearly, a slight increase in h can significantly reduce dV/S. Similarly, a slight reduction in bias current I can have the same effect since dV is directly related to the cube of I, while S is directly related only linearly. It should also be apparent by reference to Eqs. 6 and 7 that an appropriate reduction in the sensor thickness t and a corresponding reduction in bias current I (to maintain S at the desired level) will also decrease dV/S. Also, selection of an appropriate material which has a high thermal conductivity, $K_{INS}$ for the gap between MR sensor 60 and shields 62, 63 will make the MR sensor 60 operate cooler and will reduce dV by the square of any increase in the value of $K_{INS}$. Thus by appropriate selection of these design parameters of the MR sensor it is possible to design a contact recording disk file with a MR sensor which minimizes the effect of the unexpected baseline signal modulation caused by waviness of the disk substrate, and without the need for a filter in the read channel. It is also possible to minimize the effect of baseline signal modulation by making the disk as smooth as possible. Since dV is directly related to dX, as shown in Eq. 6, dV will go to zero if the disk were perfectly smooth (dX=0). However, since there are limits to achievable disk smoothness, an alternative approach is to minimize the maximum dimension or "length" of the contact pad of the head carrier, or assure that its "length" is less than the period of the "waviness" of the disk. The waviness period can be defined as the linear distance from peak-to-peak or valley-to-valley in the disk surface. (See waviness period L in FIG. 8). Thus referring now to FIG. 13, an idealized representation is shown when the portion of the head carrier in contact with the disk, contact pad 150, with an MR sensor 160, rides on a disk 170 having a waviness period L and amplitude ΔX. The variation dX of MR sensor 160 above the surface of disk 170 is due in part because the length of contact pad 150 is greater than the average disk waviness period L. Thus, by assuring that the length of contact pad 150 is less than L, either by reducing its length and/or improving the smoothness of the disk, so that the pad 150 has dimensions small enough to fit between the disk peaks, the effect of baseline signal modulation can be reduced. This is illustrated in FIG. 14, where a narrow contact pad 180, having a length much less than L, is shown following the waviness of disk 170, thereby reducing dX and minimizing dV/S.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A data recording disk file comprising:

a rigid magnetic recording disk for the storage of data;

means connected to the disk for rotating the disk;

a magnetoresistive head for generating a signal in response to data magnetically recorded on the disk, the magnetoresistive head being at a temperature higher than the temperature of the disk;

a carrier supporting the magnetoresistive head and in contact with the disk during reading of the data by the magnetoresistive head, the temperature of the magnetoresistive head and therewith its electrical resistance varying in response to variations in spacing between the magnetoresistive head and the lower-temperature disk as the disk rotates with the carrier in contact;

means for processing the signal from the magnetoresistive head, the signal received by the processing means having baseline modulation as a result of said electrical resistance variation of the magnetoresistive head;

means for minimizing said baseline modulation; and means connected to the carrier for moving the carrier and supported magnetoresistive head across the disk.

2. The disk file according to claim 1 wherein the disk includes a liquid film on its surface for providing a liquid bearing and wherein the carrier includes means for supporting the carrier on the liquid bearing.

3. The disk file according to claim 2 wherein the carrier includes a ski foot for riding on the liquid film.

4. The disk file according to claim 2 wherein the carrier includes a plurality of pads for plowing through the liquid film.

5. The disk file according to claim 1 wherein the carrier includes a wear surface for wearing away during contact with the disk.

6. The disk file according to claim 5 wherein the disk includes lubricant on its surface for contact by the wear surface of the carrier.

7. The disk file according to claim 1 further comprising means for maintaining the carrier in contact with the disk and wherein the carrier and the means for maintaining the carrier in contact are formed as an integrated head-suspension, the integrated head-suspension having a wear surface for contact with the disk.

8. The disk file according to claim 7 wherein the disk includes lubricant on its surface for contact by the wear surface of the integrated head-suspension.

9. The disk file according to claim 1 wherein the baseline modulation minimizing means further comprises means for filtering the baseline modulation signal generated by the magnetoresistive head.

10. The disk file according to claim 1 wherein the baseline modulation minimizing means further comprises means for maintaining the temperature of the magnetoresistive head below a predetermined value.

11. The disk file according to claim 1 wherein the means for minimizing baseline modulation comprises said magnetoresistive head of a predetermined height such that the ratio of the baseline modulation signal to the amplitude of the magnetic signal sensed by the magnetoresistive head is less than approximately 0.2.

12. The disk file according to claim 1 wherein the means for minimizing baseline modulation comprises means for supplying to the magnetoresistive head a bias current having a value such that the ratio of the baseline modulation signal to the amplitude of the magnetic signal sensed by the magnetoresistive head is less than approximately 0.2.

13. The disk file according to claim 1 wherein the means for minimizing baseline modulation minimizes the baseline modulation signal generated by the magnetoresistive head to less than twenty percent of the amplitude of the magnetic signal sensed by the magnetoresistive head.

14. The disk file according to claim 1 further comprising an inductive write head connected to the carrier for writing data on the disk.

15. A magnetic recording disk drive comprising:

a rigid magnetic recording disk having a surface waviness;

a motor connected to the disk for rotating the disk;

a magnetoresistive read sensor for sensing magnetically recorded data from the disk and for generating a signal, the read sensor being heated by an electrical current;

a carrier supporting the read sensor and in contact with the disk during the sensing of data by the read sensor, the spacing between the read sensor and the surface of the disk varying as the disk rotates, due to the surface waviness of the disk;

an actuator connected to the carrier for moving the carrier generally radially across the disk so the read sensor may access different regions of data on the disk;

means coupled to the read sensor for processing the signal from the read sensor, the signal from the read sensor including a baseline modulation induced by the variation in spacing between the heated read sensor and the surface of the disk;

means for reducing said induced baseline modulation; and means for supporting the motor and actuator.

16. The disk drive according to claim 15 wherein the disk includes a liquid film on its surface for providing a liquid bearing and wherein the carrier includes means for supporting the carrier on the liquid bearing.

17. The disk drive according to claim 16 wherein the carrier includes a ski foot for riding on the liquid film.

18. The disk drive according to claim 16 wherein the carrier includes a plurality of pads for plowing through the liquid film.

19. The disk drive according to claim 15 wherein the carrier includes a wear surface for wearing away during contact with the disk.

20. The disk drive according to claim 19 wherein the disk includes a lubricant for contact by the wear surface of the carrier.

21. The disk drive according to claim 19 wherein the carrier is an integrated head-suspension, the integrated head-suspension having a wear surface for contact with the disk, and wherein the integrated head-suspension includes a suspension for maintaining the wear surface generally in contact with the disk.

22. The disk drive according to claim 21 wherein the disk includes a lubricant for contact by the wear surface of the integrated head-suspension.

23. The disk drive according to claim 15 wherein the baseline modulation reducing means further comprises means for filtering the baseline modulation signal generated by the magnetoresistive read head.

24. The disk drive according to claim 15 wherein the means for reducing the baseline modulation comprises means for maintaining the temperature of the heated magnetoresistive read sensor below a predetermined value.

25. The disk drive according to claim 15 wherein the means for reducing the baseline modulation comprises said magnetoresistive read sensor of a predetermined height such that the ratio of the baseline modulation signal sensed by the magnetoresistive read sensor to the amplitude of the magnetic signal sensed by the magnetoresistive read sensor is less than approximately 0.2.

26. The disk drive according to claim 15 wherein the means for reducing the baseline modulation comprises insulator material in a gap of the magnetoresistive read sensor of a predetermined thermal conductivity sufficient to cool the magnetoresistive read sensor an amount such that the ratio of the baseline modulation signal sensed by the magnetoresistive read sensor to the amplitude of the magnetic signal sensed by the magnetoresistive read sensor is less than approximately 0.2.

27. The disk drive according to claim 15 wherein the means for reducing the baseline modulation comprises means for supplying to the magnetoresistive read sensor a bias current having a value such that the ratio of the baseline modulation signal to the amplitude of the magnetic signal sensed by the magnetoresistive read sensor is less than approximately 0.2.

28. The disk drive according to claim 15 wherein the means for reducing the baseline modulation reduces the baseline modulation signal to less than twenty percent of the amplitude of the magnetic signal sensed by the magnetoresistive read sensor.

29. The disk drive according to claim 15 further comprising an inductive write head connected to the carrier for writing data on the disk.

30. A data recording disk file comprising:

a rigid magnetic recording disk for the storage of data, the disk having a surface waviness;

means connected to the disk for rotating the disk;

a magnetoresistive head for generating a signal in response to data magnetically recorded on the disk, the magnetoresistive head being at a temperature higher than the temperature of the disk;

a carrier supporting the magnetoresistive head and in contact with the disk during reading of the data by the magnetoresistive head, the portion of the carrier in contact with the disk having a length less than the period of the surface waviness of the disk to minimize variation in spacing between the magnetoresistive head and the surface of the lower-temperature disk as the disk rotates, whereby variation in the temperature and therewith the electrical resistance of the magnetoresistive head is minimized;

means for processing the signal from the magnetoresistive head, the signal received by the processing means having a baseline modulation signal, due to said electrical resistance variation, of less than twenty percent of the amplitude of the magnetic signal sensed by the magnetoresistive head as a result of said spacing variation being minimized by the length of the portion of the carrier in contact with the disk; and means connected to the carrier for moving the carrier and supported magnetoresistive head across the disk.

31. A magnetic recording disk drive comprising:

a rigid magnetic recording disk having a surface waviness;

a motor connected to the disk for rotating the disk;

a magnetoresistive read sensor for sensing magnetically recorded data from the disk, the read sensor being heated by an electrical current;

a carrier supporting the read sensor and in contact with the disk during the sensing of data by the read sensor, the portion of the carrier in contact with the disk having a length less than the period of the surface waviness of the disk, whereby variation in spacing between the heated read sensor and the surface of the disk as the disk rotates is reduced;

an actuator connected to the carrier for moving the carrier generally radially across the disk so the read sensor may access different regions of data on the disk;

means coupled to the read sensor for processing the signal from the read sensor, the signal from the read sensor having minimal baseline modulation induced by variation in spacing between the heated read sensor and the surface of the disk as a result of said spacing variation being reduced by the length of the portion of the carrier in contact with the disk; and means for supporting the motor and actuator.

* * * * *